(12) United States Patent
Zhang

(10) Patent No.: US 8,813,555 B2
(45) Date of Patent: Aug. 26, 2014

(54) ANGLE TEST APPARATUS FOR TORSION SPRING

(75) Inventor: Bing-Jun Zhang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 183 days.

(21) Appl. No.: 13/448,423

(22) Filed: Apr. 17, 2012

(65) Prior Publication Data
US 2013/0239697 A1    Sep. 19, 2013

(30) Foreign Application Priority Data

Mar. 19, 2012  (CN) .......................... 2012 1 0072364

(51) Int. Cl.
*G01L 1/04*    (2006.01)
*G01N 3/26*    (2006.01)

(52) U.S. Cl.
USPC ................................. 73/161; 73/856; 73/859

(58) Field of Classification Search
CPC ........................................................ G01B 5/24
USPC ........................................... 73/856, 859, 161
See application file for complete search history.

(56) References Cited

U.S. PATENT DOCUMENTS

| | | | | | |
|---|---|---|---|---|---|
| 2,577,805 | A | * | 12/1951 | Pidduck | 73/161 |
| 2,799,162 | A | * | 7/1957 | Carlson | 73/161 |
| 2,812,659 | A | * | 11/1957 | Humphreys | 73/161 |
| 3,209,590 | A | * | 10/1965 | Klatchko | 73/161 |
| 5,855,138 | A | * | 1/1999 | Curry et al. | 73/161 |
| 8,408,069 | B2 | * | 4/2013 | Lin | 73/847 |

* cited by examiner

*Primary Examiner* — Lisa Caputo
*Assistant Examiner* — Roger Hernandez-Prewit
(74) *Attorney, Agent, or Firm* — Novak Druce Connolly Bove + Quigg LLP

(57) ABSTRACT

An apparatus for testing an angle between first and second legs of a torsion spring includes a board, a limiting block and a pin sandwiching the first leg, a positioning member positioning a main body of the torsion spring with the limiting block, and a test block including a bottom wall slidably contacting the limiting block, and a first sidewall and a second sidewall. Angles between the bottom wall and the first and second sidewalls are respectively minimal and maximal values that equal 180 degrees subtracted by an angle within a qualified range between the first and second legs. The first and second sidewalls is moved toward the second leg in turn. If a bottom end of the first sidewall and a top end of the second sidewall both can contact the second leg, the angle between the first and second legs is qualified. Otherwise, the angle is unqualified.

6 Claims, 6 Drawing Sheets

ANGLE TEST APPARATUS FOR TORSION SPRING

BACKGROUND

1. Technical Field

The present disclosure relates to an apparatus for testing an angle between two legs of a torsion spring.

2. Description of Related Art

The angle between two legs of a torsion spring is generally tested by angle rulers or projective measurements. However, if the length of a twisted main body of the torsion spring is too long or the diameter of the main body is too large, the angle ruler will be useless. Although a projective measurement may be more effectible than angle rulers, the projective measurement will be imprecise because the main body cannot stand evenly on the platform while keeping its particular form.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
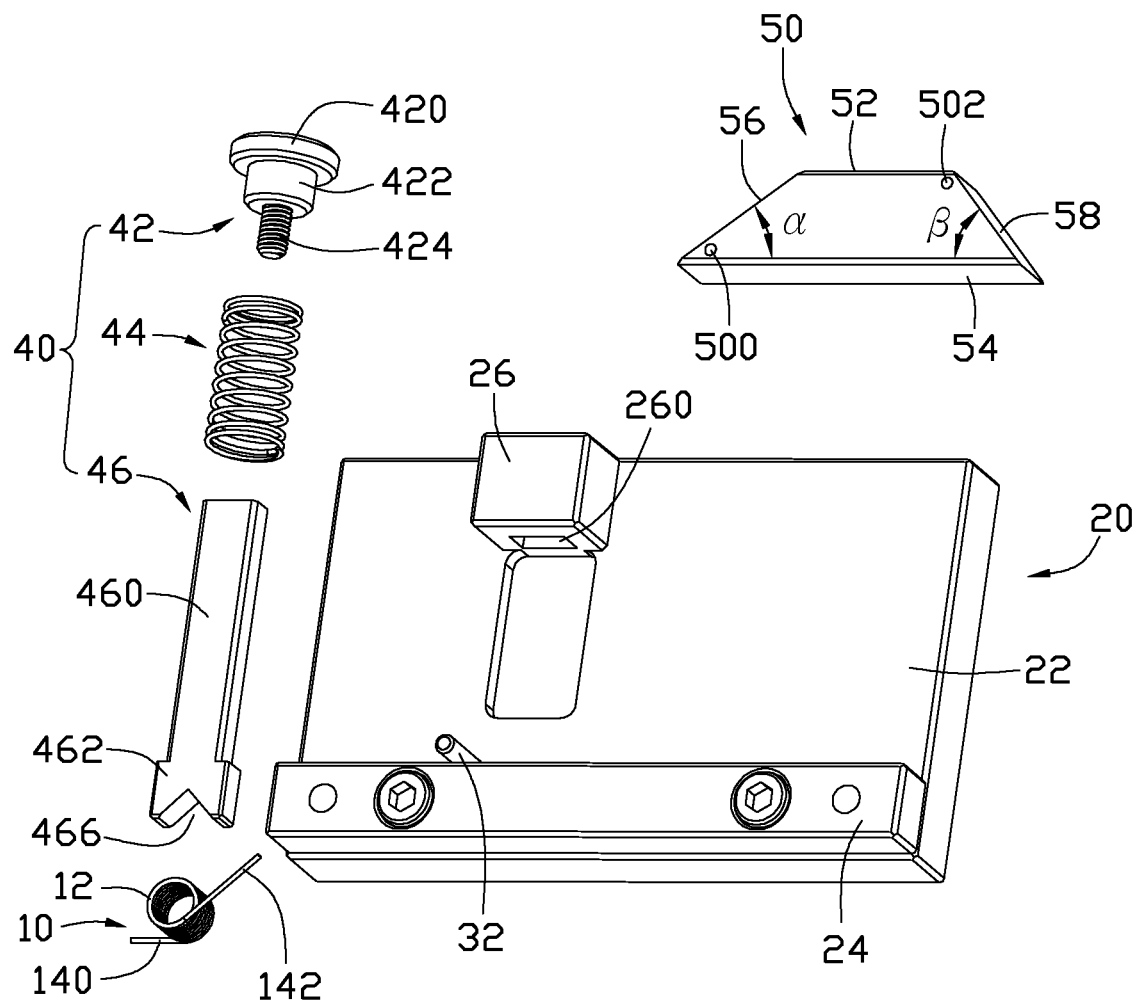
FIG. 1 is an exploded, isometric view of an exemplary embodiment of an angle test apparatus, together with a torsion spring.

FIG. 1, is an exemplary embodiment of an angle test apparatus provided for testing whether an angle between two legs of a torsion spring 10 qualifies or not. The angle test apparatus includes a platform 20, a positioning member 40, and a test block 50.

The torsion spring 10 includes a twisted main body 12, a first leg 140 and a second leg 142 extending out from opposite ends of the main body 12.

The platform 20 includes a rectangular board 22, a bar-shaped limiting block 24 mounted on a front side of a top surface of the board 22, and an installation block 26 mounted on a rear side of the top surface of the board 22 opposite to the limiting block 24. A pin 32 perpendicularly extends up from the top surface of the board 22, adjacent to a rear side of the limiting block 24. The installation block 26 defines a through hole 260 extending along a direction perpendicular to the limiting block 24.

The positioning member 40 includes a screw 42, a spring 44, and a movable block 46.

The screw 42 includes a blocking portion 422, and an operation portion 420 and a threaded pole 424 connected to opposite sides of the blocking portion 422.

The movable block 46 includes a bar 460 defining a threaded hole (not shown) in an end surface of a first end of the bar 460, and a clamping portion 462 formed on a second end of the bar 460 opposite to the first end. A V-shaped opening 466 is defined in the clamping portion 462, with a large end of the opening 466 extending through an end surface of the clamping portion 462 opposite to the bar 460.

The test block 50 is trapezoid-shaped, and includes a top wall 52, a bottom wall 54 parallel to the top wall 52, and a first sidewall 56 and a second sidewall 58 slantingly connected between opposite ends of the top and bottom walls 52 and 54. The length of the second sidewall 58 is less than the first sidewall 56. The angle between the bottom wall 54 and the first sidewall 56 is $\alpha$. The angle between the bottom wall 54 and the second sidewall 58 is $\beta$. The test block 50 defines a first through hole 500 adjacent to a junction of the first sidewall 56 and the bottom wall 54, and a second through hole 502 adjacent to a junction of the second sidewall 58 and the top wall 52. The angle $\alpha$ is set to be the minimum value of 180 degrees subtracting a angle within a qualified range between the first and second legs 140 and 142. The angle $\beta$ is set to be the maximal value of 180 degrees subtracting a angle within a qualified range between the first and second legs 140 and 142 from 180 degrees.

Figure 2:
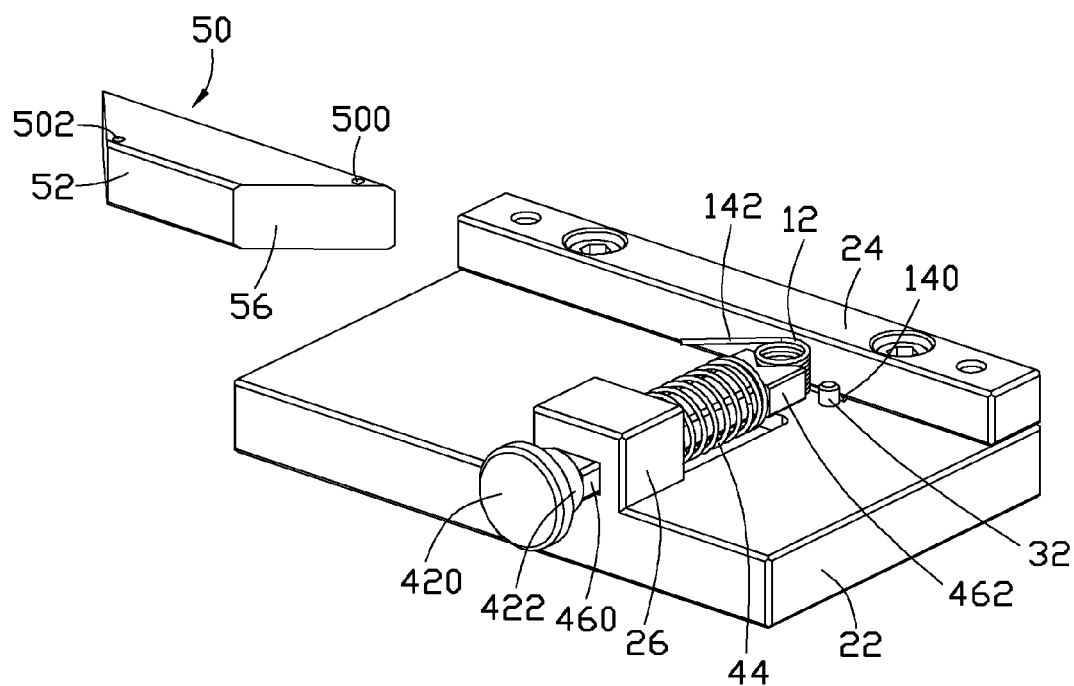
FIG. 2 is a partly assembled, isometric view of the angle test apparatus of FIG. 1.
Figure 3:
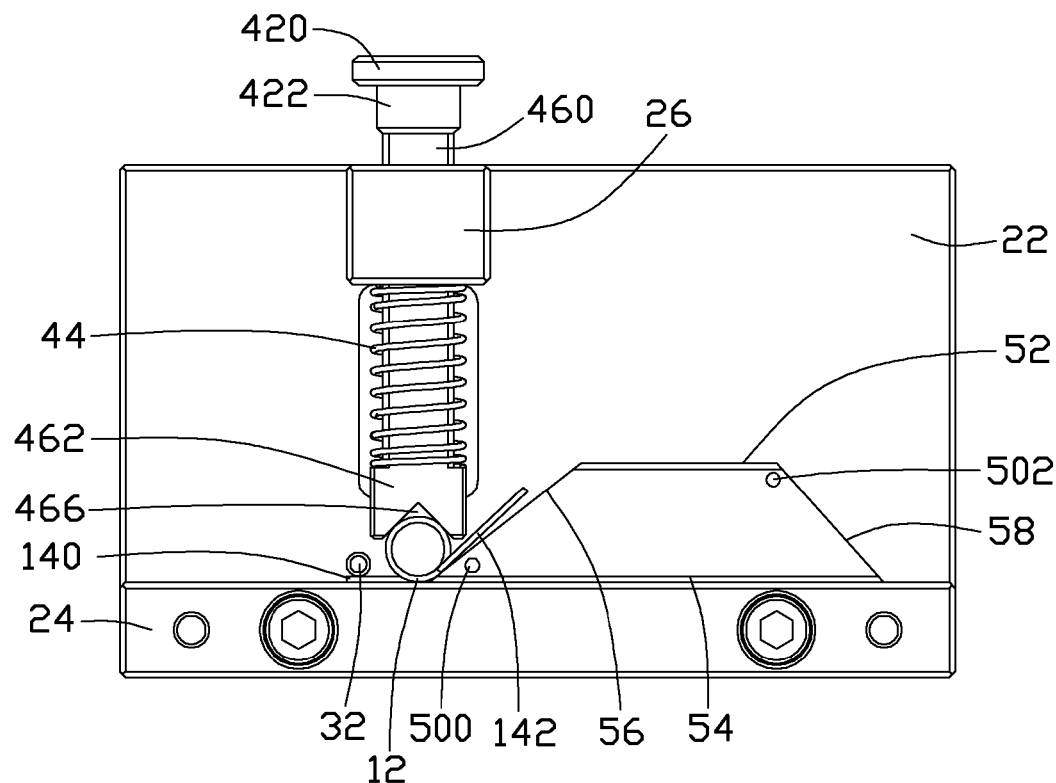
FIG. 3 is an assembled, top plan view of the angle test apparatus of FIG. 2.
Figure 4:
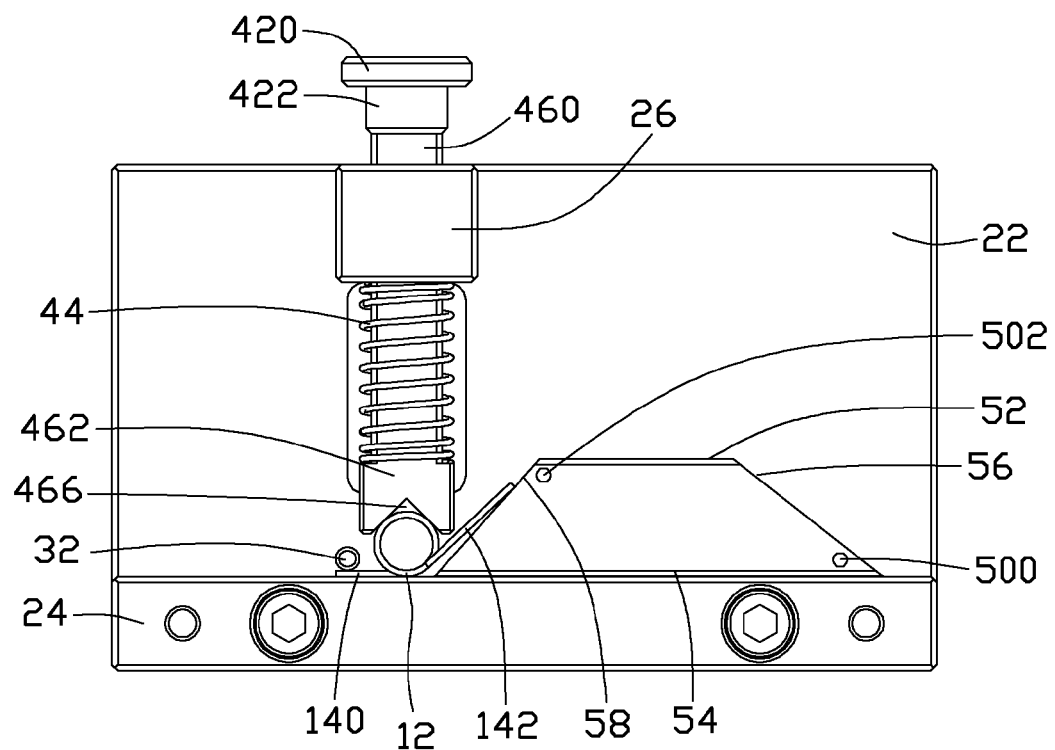
FIGS. 4-6 are similar to FIG. 3, but show different using states.
Figure 5:
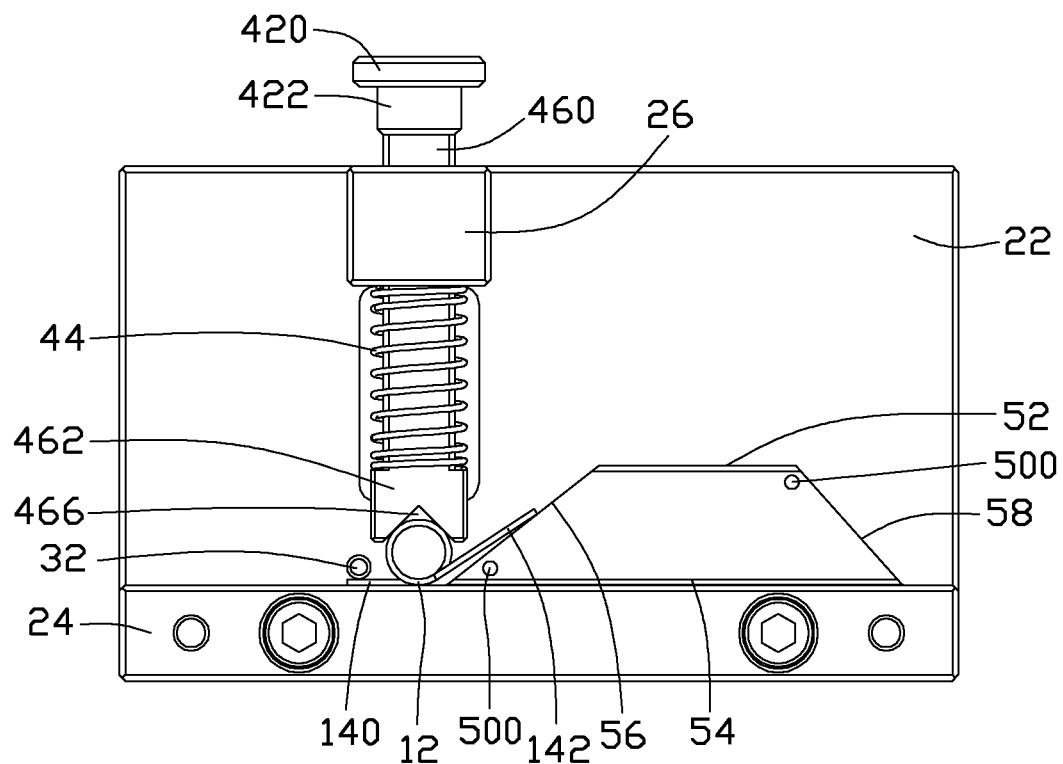
Figure 6:
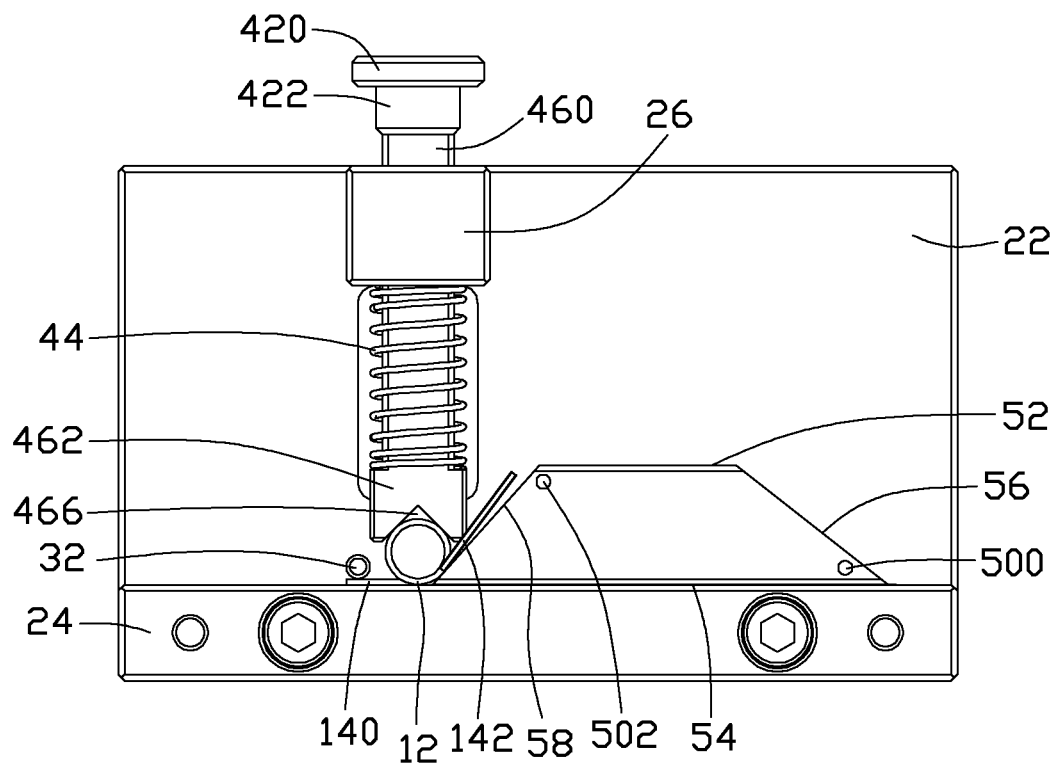

FIG. 2, shows in assembly, the spring 44 is fitted about the bar 460. The bar 460 is then extended through the through hole 260 from a space between the installation block 26 and the limiting block 24, thereby, the spring 44 is sandwiched between the installation block 26 and the clamping portion 462. The threaded pole 424 is screwed into the threaded hole of the bar 460, until the blocking portion 422 abuts against the rear side of the installation block 26, to movably install the movable block 46 to the platform 20. The pin 32 is positioned at a side of the movable block 46.

FIG. 3 to FIG. 6, show in testing the torsion spring 10, the operation portion 420 is operated to move the movable block 46 toward the installation block 26. The spring 44 is deformed. The main body 12 of the torsion spring 10 is engaged in the opening 466, and then is blocked by the limiting block 24 after the spring 44 is restored. The first leg 140 is sandwiched between the pin 32 and the limiting block 24.

The test block 50 is put on the board 22, and the bottom wall 52 is slidably contacted with the rear side of the limiting block 24. The first and second sidewalls 56 and 58 are arranged to face the second leg 142 in turn. The test block 50 is slid toward the second leg 142 each time. If the bottom end (adjacent to the first through hole 500) of the first sidewall 56 and the top end (adjacent to the second through hole 502) of the second sidewall 58 both contact the second leg 142, the angle between the first and second legs 140 and 142 is qualified (shown in FIGS. 3 and 4). Otherwise, the angle between the first and second legs 140 and 142 is unqualified (shown in FIGS. 5 and 6).

In this embodiment, the first and second through holes 500 and 502 are defined as two reference objects. In another embodiment, the first and second through holes 500 and 502 may be omitted.

It is believed that the present embodiments and their advantages will be understood from the foregoing description, and various changes may be made thereto without departing from the spirit and scope of the description or sacrificing all of their material advantages, the examples hereinbefore described merely being exemplary embodiments.

What is claimed is:

1. An angle test apparatus for testing whether an angle between a first leg and a second leg of a torsion spring with a twisted main body is qualified or not, the angle test apparatus comprising:
   a board;
   a limiting block mounted to a first side of the board; and
   a pin mounted on the board and adjacent to the limiting block, for sandwiching the first leg together with the limiting block;
   a positioning member slidably mounted to a second side of the board opposite to the limiting block, for sandwiching the main body of the torsion spring together with the limiting block; and
   a test block supported on the board, and comprising a bottom wall, a first sidewall and a second sidewall slantingly connected to opposite ends of the bottom wall, angles between the bottom wall and the first and second sidewalls are respectively minimal and maximal values that equals 180 degrees subtracted by an angle within a qualified range between the first and second legs;
   wherein, a tested torsion spring placed on the board with its first leg being sandwiched between the pin and the limiting block, the first and second sidewalls operable to move towards the second leg, the bottom wall is slidable along the limiting block to contact the second leg;
   if a bottom end of the first sidewall adjacent to the bottom wall and a top end of the second sidewall opposite to the bottom wall both are capable of contacting the second leg, an angle between the first and second legs of the tested torsion spring is qualified; otherwise, the angle between the first and second legs of the tested torsion spring is unqualified.

2. The test apparatus of claim 1, wherein the block defines a first through hole adjacent to a bottom end of the first sidewall, and a second through hole adjacent to a top end of the second sidewall.

3. The test apparatus of claim 1, further comprising an installation block mounted to the second side of the board, wherein the installation block defines a through hole extending along a direction perpendicular to the limiting block, the positioning member comprising a bar capable to slide to extend through the through hole; a screw is engaged into a first end of the bar opposite to the limiting block and blocked by a side of the installation block opposite to the limiting block, a clamping portion extends from a second end of the bar adjacent to the limiting block, for sandwiching the main body of the torsion spring together with the limiting block; and a spring is fitted about the bar between the installation block and the clamping portion, to bias the clamping portion to move toward the limiting block.

4. The test apparatus of claim 3, wherein an opening is defined in the clamping portion, extending through an end of the clamping portion facing the limiting block, for receiving the main body of the torsion spring.

5. The test apparatus of claim 3, wherein the screw comprises a blocking portion blocked by the installing block, and an operation portion and a threaded pole connected to opposite sides of the blocking portion, the threaded pole is screwed into the bar.

6. The test apparatus of claim 1, wherein the test block is trapezoid-shaped.

* * * * *